(12) United States Patent
Caillier et al.

(10) Patent No.: US 9,920,208 B2
(45) Date of Patent: Mar. 20, 2018

(54) HEAT-STABLE PARTICULATE INK FOR INKJET USE

(71) Applicant: SEB S.A., Ecully (FR)

(72) Inventors: Laurent Caillier, Rumilly (FR); Stephanie Le Bris, Chambery (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/408,445

(22) PCT Filed: Jun. 24, 2013

(86) PCT No.: PCT/FR2013/051471
§ 371 (c)(1),
(2) Date: Dec. 16, 2014

(87) PCT Pub. No.: WO2013/190251
PCT Pub. Date: Dec. 27, 2013

(65) Prior Publication Data
US 2015/0152273 A1   Jun. 4, 2015

(30) Foreign Application Priority Data
Jun. 22, 2012 (FR) ..................... 12 55925

(51) Int. Cl.
| C09D 11/30 | (2014.01) |
| C09D 11/106 | (2014.01) |
| C09D 11/108 | (2014.01) |
| C09D 11/322 | (2014.01) |
| C09D 11/324 | (2014.01) |
| C09D 127/18 | (2006.01) |
| C09D 127/20 | (2006.01) |
| C09D 161/02 | (2006.01) |
| C09D 179/08 | (2006.01) |
| C09D 181/04 | (2006.01) |
| C09D 181/06 | (2006.01) |

(52) U.S. Cl.
CPC ............ *C09D 11/30* (2013.01); *C09D 11/106* (2013.01); *C09D 11/108* (2013.01); *C09D 11/322* (2013.01); *C09D 11/324* (2013.01); *C09D 127/18* (2013.01); *C09D 127/20* (2013.01); *C09D 161/02* (2013.01); *C09D 179/08* (2013.01); *C09D 181/04* (2013.01); *C09D 181/06* (2013.01)

(58) Field of Classification Search
CPC ....................................... C09D 11/30
USPC ................................. 523/160, 161
See application file for complete search history.

(56) References Cited

U.S. PATENT DOCUMENTS

| 5,308,426 A | 5/1994 | Claveau | |
| 5,922,468 A * | 7/1999 | Huesmann | B05D 5/083 428/421 |
| 6,333,372 B1 * | 12/2001 | Tomihashi | C09D 5/002 524/104 |
| 6,358,487 B1 * | 3/2002 | Omae | C09C 1/50 423/450 |
| 6,863,974 B2 * | 3/2005 | Shah | B05D 5/083 427/385.5 |
| 8,703,238 B2 | 4/2014 | Leenders, et al. | |
| 2002/0014184 A1 * | 2/2002 | Yeh | C09B 67/0001 106/472 |
| 2002/0041372 A1 * | 4/2002 | Gardner | G07F 7/086 356/71 |
| 2010/0227948 A1 | 9/2010 | Nagase, et al. | |

FOREIGN PATENT DOCUMENTS

| CA | 2039054 | 3/1991 |
| CN | 101292000 A | 10/2008 |
| EP | 0451067 A1 | 4/1991 |
| EP | 0544603 A1 | 11/1992 |
| EP | 0851010 A1 | 7/1998 |
| WO | 9810025 A1 | 3/1998 |
| WO | 2010147589 A1 | 12/2010 |
| WO | WO 2010/147589 | * 12/2010 |

OTHER PUBLICATIONS

Dupont Zonyl PTFE TE-3887, (Jan. 2007).*

* cited by examiner

*Primary Examiner* — Doris L Lee
(74) *Attorney, Agent, or Firm* — The Webb Law Firm

(57) ABSTRACT

Provided is a heat-stable particulate composition for inkjet use, preferably pigmented and including 10 wt % to 95 wt % of water relative to the total weight of the composition, and 90 wt % to 5 wt % of at least one fluorinated heat-stable binder in particle form, at least one of the characteristic dimensions thereof being smaller than 800 nm.

14 Claims, No Drawings

HEAT-STABLE PARTICULATE INK FOR INKJET USE

CROSS-REFERENCE TO RELATED APPLICATIONS

This application is the United States national phase of International Application No. PCT/FR2013/051471 filed Jun. 24, 2013, and claims priority to French Patent Application No. 1255925 filed Jun. 22, 2012, the disclosures of which are hereby incorporated in their entirety by reference.

FIELD OF THE INVENTION

The present invention generally relates to the formulation of a heat-stable particulate composition or ink for inkjet use, capable of being used on any type of substrate, but particularly on substrates that are subjected to high temperatures (specifically to temperatures greater than or equal to 250° C.) during the manufacturing thereof or the use thereof.

Although the intended field is primarily that of culinary articles, the present invention can also relate to all other kinds of articles intended to be shaped and/or subjected to high use temperatures, such as the sole of a clothes iron or the plates of a straightening iron, the bowl of a fryer or bread maker, or the bowl of a blender.

In the sense of the present invention, heat-stable particulate ink (or composition) for inkjet use is understood to mean an aqueous composition capable of being ejected by an inkjet printing device and comprising at least one heat-stable fluorinated binder.

If the composition does not comprise any heat-stable pigment, the ink is transparent and instead constitutes a varnish, this type of ink being used when one wants to obtain a laminate or a relief effect, for example.

If the composition also comprises at least one heat-stable pigment besides the heat-stable fluorinated binder, it then truly constitutes an ink in the usual sense of the term. In the context of the present invention, a heat-stable particulate composition is one such that the printing result does not show any noticeable, undesired, or uncontrolled change of color or properties after exposure to at least a temperature of 110° C., and above all to temperatures of at least 250° C.

In the sense of the present invention, binder is understood to mean a chemical compound with a high molecular weight (greater than 1000 Da) initially present in the ink and capable of forming a film by drying, by coalescence, or by heat treatment.

Heat-stable binder is understood to mean a binder that is temperature-stable and does not show any changes (such as chain cleavages), including at temperatures of at least 250° C., once the film is formed.

In the sense of the present invention, heat-stable pigment is understood to mean a particulate or insoluble dye substance that withstands heat effectively or in other words has stable physicochemical properties in response to temperature.

In the context of the present invention, heat-stable pigments also include thermochromic pigments, the stable behavior of which in response to temperature is expressed in their capability of showing the same color contrast in response to temperature, even after previous exposure to a temperature higher than that of their color changing.

DESCRIPTION OF RELATED ART

Several kinds of techniques for decorating a culinary article are known to the prior art. Specifically, using the techniques of screen printing or pad printing for applying patterns to flat surfaces in order to decorate them is known to persons skilled in the art. These techniques permit a shaping operation of the article performed after the application of patterns by screen printing or pad printing.

If use is made of screen printing (or pad printing) for applying multicolored patterns, it is then necessary to carry out several screen printing (or pad printing) operations in sequence, depending upon the number of colors: each color requires a screen printing (or pad printing) pass and obviously each printing must be followed by a drying operation before printing the next layer of ink. Such a printing technique is only profitable when the same image or pattern is applied on a large number of substrates. For applying prints to a small number of items, multicolor screen printing (or pad printing) is very expensive and not at all profitable, since a separate screen (or engraved stamp) is needed for each base color. Furthermore, the cost of making and cleaning the printing screen is high and the time that it takes to make the screen is long, which requires flawless production scheduling. Additionally, changing the hue, even in an identical graphic, requires thorough cleaning and cuts into production time (the same applies for an engraved stamp). Furthermore, the techniques of screen printing and pad printing generate significant stocks of intermediate products and components (specifically inks, screens, semi-finished caps, etc.).

Also known to the prior art is the use of dye sublimation printing technique for obtaining a decorated culinary article. Basically, sublimation is the transformation of a solid body into gas or vapor without passing through the liquid state. According to the dye sublimation printing technique, the pattern initially printed on a substrate (paper or plastic film) is pressed onto the surface of the article to be decorated, and then the whole is brought briefly to a temperature comprised between 150° C. and 210° C. Standard dye sublimation printing is only used for flat articles because pressing the substrate onto an article that is not flat would result in wrinkling and consequently printing defects. However, the referenced documents EP 0451067 and EP 544603 disclose improvements to the dye sublimation printing method that enable the decoration of all surfaces of an article of any shape. However, such improvements render the dye sublimation printing methods very complicated to employ and not very productive.

Also known to the prior art is the use of a printing technique known as inkjet, which consists of projecting drops of ink from a small opening onto precisely determined places on a substrate so as to create an image. Inkjet printing is the only non-contact printing technique.

A distinction is made between two kinds of inkjet printing techniques: the first is known as "continuous inkjet" (CIJ) and the second is known as "drop on demand" (DOD).

The CIJ inkjet printing technique is based upon the controlled fragmentation of a jet of fluid. Interferences induce the break-up of the jet into droplets of a controlled size at a well determined velocity. This is achieved by synchronizing the break-up of the jet with its velocity. The ink droplets that reach the printing substrate are selected by electrostatic means (the drops are charged and then these drops are deflected by an electric field).

In contrast, the DOD inkjet printing technique is based on a different physical process: the ink remains in the container, forming a meniscus at the nozzle, until a pressure applied to the volume of fluid exceeds the surface tension and permits the ejection of a droplet. This technical choice, which predominates nowadays, is based on four ejection techniques: piezoelectric, thermal (or bubble jet), valve jet, and heat fusion. The piezoelectric ejection technique is currently the most developed one. It functions according to the following principle:

the ink container of the printing device is brought into contact with a piezoelectric crystal designed to convert an electrical excitation (in the form of pulses) into a mechanical force;

the electrical excitation induces a deformation of the wall of the container, which in turn leads to an overpressure;

this overpressure causes the ejection of a drop.

The inkjet printing technique has intrinsic advantages that, in conjunction with the development of computer tools and an increase in printing quality and velocities, explain its success.

From a methods standpoint, such a technology (inkjet printing) makes it possible to limit the number of ink formulations to manage (four for quadrichrome printing, and six for hexachrome printing), which is an undeniable advantage in terms of formulation and storage. Furthermore, inkjet printing is a printing technology in which there is no contact with the substrate: the absence of an image carrier (screen, engraved stamp, or pre-printed substrate for dye sublimation) makes it possible to eliminate the preparation work needed for employing other printing techniques, namely the preparation of screens, the engraving of stamps or possibly substrates (paper or plastic film). Furthermore, the dynamic management of printing data, which vary more particularly with each object to be printed, allows the personalization of articles and permits the production of very small series without incurring prohibitive costs. There is no waste of ink, as consumption is reduced to exactly what is necessary and the losses in the equipment are very minor due to the smallness of the printing heads. Lastly, inkjet printing permits immediate changing of series and traceability in production. In conclusion, the space taken up by an inkjet printing device is minor in comparison to the series of screen printing or pad printing machines used to produce the same output.

From a products standpoint, inkjet printing makes it possible to produce designs in a wide variety of colors and complex patterns (photos, textures, stone, wood, or marble effects, etc.) with high definition. Such a technology also makes it possible to print on substrates in relief by coupling the head with a robot.

From an applications standpoint (in the sense of the nature of the substrates used for applying the ink by inkjet printing), besides office work and document personalization (custom designs upon request), the applications of inkjet printing are diverse: large and extra-large format posters, printing on textiles, designs on ceramics, labeling, addressing, printing on food items, deposition of active ingredients, deposition of biomaterials, printing with electrically conductive inks, etc.

Among the various applications of inkjet printing technique, one application concerns the decoration of articles for which the manufacturing process requires baking at very high temperatures, such as for example ceramic tiles.

In this field, the manufacturing techniques such as sintering or powder fusion require bringing the articles to temperatures of at least 300° C. and possibly up to 1300° C. and higher. With the inkjet technique it is therefore not possible to print designs using the standard inks employed in paper or textile printing because the latter are water-based (aqueous) inks containing organic dye compounds that do not withstand high temperatures. The high temperatures of the baking or use cycles lead to oxidation not only of the typically organic pigments but also of their constituent binders.

The present invention therefore addresses the problem of enabling the production, by inkjet printing, of functional or decorative layers on an article (a culinary article, for example) that is subjected to temperatures above 110° C. during its manufacturing or use.

Hence the object of the present invention is a particulate composition for heat-stable inkjet use comprising:

10 wt % to 95 wt % of water relative to the total weight of the composition, and 90 wt % to 5 wt % relative to the total weight of the composition of at least one fluorinated heat-stable binder in particle form, at least one of the characteristic dimensions thereof being smaller than 800 nm.

In the context of the present invention, characteristic dimension of the particles is understood to mean a dimension characterizing the size of the particles (specifically the diameter for spherical particles) but also their grain-size distribution, for example in terms of the characteristic dimensions "D50" or "D99".

In the context of the present invention, the term "D50" is understood to mean the maximum dimension that 50% of the particles have (median of the particle-size distribution).

In the context of the present invention, the term "D99" is understood to mean the maximum dimension that 99% of the particles have.

The heat-stable binder in the particulate composition of the invention makes it possible to guarantee that the aqueous ink layer has the required surface and durability properties and in certain cases to dispense with a protective laminate layer.

Advantageously, the heat-stable particulate composition of the invention can also comprise at least one heat-stable pigment in an amount such that said fluorinated heat-stable binder and said heat-stable pigment represent 90 to 5 wt % of the total weight of the composition, wherein said heat-stable pigment is also in particle form, at least one of the characteristic dimensions thereof being smaller than 800 nm.

A characteristic dimension of the particles of binder and, if applicable, of pigment that is smaller than 800 nm makes it possible to eliminate or at least limit the risk of clogging and damaging the printing head nozzles.

As fluorinated heat-stable binders that can be used in the heat-stable particulate composition of the invention, mention can be made specifically of polytetrafluoroethylene (PTFE), tetrafluoroethylene/perfluoropropyl vinyl ether copolymer (PFA), and tetrafluoroethylene/hexafluoropropene copolymer (FEP), polyvinylidene fluoride (PVDF), MVA (TFE/PMVE copolymer), TFE/PMVE/FAVE terpolymer, ETFE, polychlorotrifluoroethylene (PCTFE), the associated copolymers thereof, and mixtures thereof.

As pigments that can be used in the heat-stable particulate composition of the invention, mention can be made specifically of carbon blacks, heat-stable pigments (e.g., $CoAl_2O_4$, iron III oxide, chromium and antimony titanate, silicoaluminates, nickel-titanium yellows, titanium dioxide, inorganic pigments with spinel crystalline structures comprising various metal oxides, mica glitter coated with iron oxide or titanium oxide, aluminum glitter coated with iron oxide, perylene red, thermochromic semi-conductor pigments (e.g., semiconductor metal oxides such as $Fe_2O_3$, $Bi_2O_3$, $BiVO_4$, etc.) and mixtures thereof.

These pigments have excellent heat resistance, whether carbon blacks or metal oxides or organic molecules such as perylene red, which are particularly temperature-stable.

Lastly, as pigments use can also be made of nanometric inorganic particles from 5 to 200 nm in size, which are not necessarily colored in formulation in the ink owing to their extremely small size, but which express their color after drying by re-agglomerating to form larger units typically greater than 350 nm in size and which become visibly colored as a result. This solution is particularly useful because it guarantees clog-free functioning of the nozzles as well as less wear on the same.

Advantageously, the particles of heat-stable binder, and if applicable of heat-stable pigment, contained in the composition of the invention may exhibit a characteristic dimension smaller than 400 nm.

The value in using particles with such dimensions lies in being able to use nozzles which themselves have small openings, ideally with a particle diameter/nozzle opening diameter ratio of ca. 1:100. It turns out that this makes it possible to limit the volume of the drop. This means prints with more precise contours and thus a better rendering. This is also an advantage even when one wants to produce flat tints (uniform color) because it limits ink consumption.

The heat-stable particulate composition (or aqueous ink) of the invention is compatible with a use in a DOD inkjet printing device because in addition to a particle size adapted to the nozzles of the printing device, it has the following physicochemical and rheological properties:
 a viscosity comprised between 2 and 25 mPa·s at ejection temperature,
 a surface tension (gamma) comprised between 22 and 40 mN/m,
the viscosity and the surface tension of the fluid being parameters making it possible to control the formation of droplets of uniform size and shape.

Furthermore and so as not to alter the constituent materials of the overall printing system (the printing head and the fluid system in particular), the pH of the composition of the invention must be as close to neutral as possible.

Advantageously, the composition of the invention further comprises at least 1 wt % relative to the total weight of said composition of at least one evaporation retardant compound with a vapor pressure less than that of water for a temperature comprised between 5° C. and 50° C. and at atmospheric pressure, said compound being in a form at least partially water miscible.

In the context of the present invention, evaporation retardant compound is understood to mean a compound that reduces/delays the evaporation of the composition of the invention.

Indeed, the aqueous ink forming a meniscus at the nozzle must not dry between two jets. To this end, preference is therefore given to the aqueous composition of the invention having a vapor pressure less than that of water: with a composition that evaporates more slowly than water it is possible to keep the nozzle moist.

Owing to the presence of an evaporation retardant compound in the aqueous composition of the invention, it is noted that maintaining a drop of the composition of the invention (which gradually becomes more concentrated in compound as it dries) at the tip of the nozzle facilitates the rewetting of the wall by the next drop, and consequently contributes to the reproducibility of the drop train and hence to the printing quality.

For choosing the evaporation retardant compound from a certain number of compounds of which the evaporation curves are sometimes poorly known, it is possible to use the boiling point data of these compounds.

Indeed, a compound with a boiling point greater than 135° C. generally makes it possible to obtain an evaporation retardant fluid that can be used in the heat-stable particulate composition of the invention.

Among the compounds that can be used in the scope of the present invention, mention can be made of surfactants, moisturizers, anti-foam agents, and water-soluble or partially water-soluble solvents. These compounds make it possible to adjust the physicochemical properties of the ink and thus modulate the stability of its ejection by a printing head, the wetting of the substrate, the film formation, etc.

In the context of the present invention, surfactant is understood to mean dispersing agents (notably for stabilizing pigments), wetting agents, emulsifiers, and foaming agents.

As water-soluble or partially water-soluble solvents that can be used in the heat-stable particulate composition of the invention, mention can be made specifically of alcohols, glycols, alkyl-glycols, alkyl phosphates, acids and their derivatives, amino-alcohols, and aprotic polar solvents.

In the context of the present invention, moisturizer is understood to mean a compound that is soluble or partially soluble (miscible or partially miscible, respectively) in water and which makes it possible to increase the water retention of the ink in the printing head.

As moisturizers that can be used in the heat-stable particulate composition of the invention, mention can be made specifically of sugars, the sodium, magnesium, zinc, and calcium salts of carboxylic acids (preferably with a carbon chain comprising more than 12 carbon atoms), and urea.

Certain compounds (for instance the glycols) can have a dual role as moisturizer and solvent.

Advantageously, the composition of the invention can comprise at least two evaporation retardant compounds.

The combination of two evaporation retardant compounds makes it possible to improve the quality or rendering of the ink significantly. For example, one of the evaporation retardant compounds can be selected for strengthening the stability of the dispersion of the pigments or of the heat-stable binder and the other for facilitating the wetting or spreading on the substrate.

Preference is given to these two evaporation retardant compounds consisting of:
 two different surfactants;
 a surfactant and a solvent; or
 a surfactant and a moisturizer; or
 a moisturizer and a solvent; or
 two solvents.

In this case (at least two evaporation retardant compounds in the composition of the invention), the sum of the weight percentages of the two evaporation retardant compounds is greater than 5 wt %, and preferably greater than 10 wt %, relative to the total weight of the composition.

Although the retardant effect of these compounds may start to be observed (as far as the evaporation of the aqueous compositions of the invention is concerned) at 5 wt % relative to the total weight of the composition, this effect is intensified as this percentage is increased. This means that the open times of the printing head nozzle become longer, which in turn facilitates industrial use.

The weight ratio of the amount of the first compound to the second is preferably comprised between 0.001 and 1000, and more preferably between 0.01 and 100.

Lastly, besides the heat-stable binder or binders and, if applicable, the pigments or the evaporation retardant compounds, etc., the composition of the invention can further comprise the following additives:
- fixatives and/or penetrators (specifically for fixing the ink to the printing substrate),
- biocides and/or fungicides (specifically for inhibiting the growth of bacteria and/or fungi),
- buffers (for regulating the pH),
- and also anti-corrosion agents, anti-foam agents, etc.

Without an evaporation retardant compound in the aqueous composition of the invention, the ejection of the composition by the printing head is still possible, but not for prolonged periods without human intervention (specifically for cleaning the nozzles).

Advantageously, the particulate composition of the invention containing a fluorinated heat-stable binder can be pigment-free and comprise at least one solvent as defined previously.

Such an embodiment makes it possible to obtain a continuous film.

Advantageously, the particulate composition of the invention can be pigment-free and comprise at least one moisturizer as defined previously.

Such an embodiment enables the composition of the invention to spread on (cover) the substrate.

Generally, regardless of the embodiment envisioned, the composition of the invention can further comprise at least one second non-fluorinated heat-stable binder.

As non-fluorinated heat-stable binders that can be used in the heat-stable particulate composition of the invention, mention can be made specifically of polyphenylene sulfide (PPS), polyethersulfone (PES), polyether ether ketones (PEEK), polyether ketones (PEK), polyamide-imides (PAI), and polyimides.

The invention is illustrated in more detail in the following examples.

All of the percentages and parts in these examples are expressed as weight percents, unless noted otherwise.

DETAILED DESCRIPTION OF THE INVENTION

Examples

Decoration Device Operating by Inkjet (DOD)

As a printing device, use is made of a DOD type device, which comprises a printing head marketed under the brand name ARDEJE HA5, comprising a nozzle, a chamber, and an ink circuit.

Products

Heat-Stable Particulate Compositions for Inkjet Use:
- Carrier: water;
- Solvents:
  - ethylene glycol;
  - propylene glycol;
  - ethanol;
- Moisturizer: glycerol;
- Pigments:
  - Shepherd aluminum-cobalt blue pigment (trade name 10C595);
  - Shepherd chromium and antimony titanate yellow pigment (trade name Y193);
  - iron oxide red pigment marketed by Bayferrox (trade name 110M);
  - perylene red red pigment marketed by BASF under the brand name Paliogen® Red K 3911;
  - Cabot surface-modified carbon black, 20% in water;
- Surfactants (dispersants):
  - high-molecular weight hyperdispersant polymer marketed by LUBRIZOL under the brand name SOLSPERSE®;
  - mixture of 50 wt % DISPERBYK®-190 and 50 wt % DISPERBYK®-180, both of these dispersants marketed by BYK;
  - fatty acid derived, non-ionic surfactant marketed by EVONIK under the brand name TEGO®;
- Surfactants (wetting agents):
  - non-ionic surfactant: polyethylene glycol isotridecyl marketed by Clariant under the brand name GENAPOL®;
- Anti-foam agents:
  - mineral oil with additives marketed by Evonik;
- Heat-stable binders:
  - fluorinated heat-stable binders:
    - PTFE dispersion with 58% dry matter marketed by Dyneon under the trade name TF 5035Z;
    - FEP dispersion with 55% dry matter marketed by Dyneon under the trade name FEP 6300GZ;
  - non-fluorinated heat-stable binder:
    - polyamide-imide resin marketed by Solvay under the name Torlon AI30.

Tests

Evaluation of the Jettability of Heat-Stable Particulate Compositions for Inkjet Use The physicochemical parameters such as the pH of the ink composition, the viscosity, and the surface tension are necessary but not sufficient conditions for guaranteeing uniform and stable ejection of the ink composition over time. Indeed, the forces to which a fluid is subjected at the time of ejection (shear force and switch-on frequency) cannot be simulated with standard analytical equipment.

Hence it is also essential to validate the jettability of a formulation (i.e., the formation of droplets of uniform size and shape with a sufficient ejection velocity and stability over time).

In the context of the present invention, jettability is understood to mean that the following criteria are fulfilled for the composition tested:
1/ the possibility that a drop will be ejected from the printing nozzle;
2/ that the train of ejected drops be regular;
3/ that the drops be not misshapen: absence of tails (drops with an elongate shape) and satellites (parasite drops ejected at other than right angles to the plane of the nozzle);
4/ a nozzle open time longer than 15 seconds, this open time corresponding to the time during which the nozzle remains free of ink evaporation residues.

The jettability of the tested compositions is evaluated by means of a printing device marketed by ARDEJE under the name HA5 at a frequency of 1.7 kHz and operating at a controlled temperature of 25° C. or 35° C.

An observation and a stroboscopic recording are made, which makes it possible to visualize the shape of the drops and the regularity of the drop train over time.

Evaluation of the Rheological Profile/Viscosity Measurement

Viscosity is measured on a Malvern Gemini rheometer. The measurement is taken at the target temperature for the ejection of the ink with a mobile cone/plate (2% slope for a 55 mm diameter). The viscosity is calculated by averaging the instantaneous viscosities measured for velocity gradients greater than 5 $s^{-1}$.

Example 1: Pigmented Aqueous Ink EA1 of the Invention, Containing a Fluorinated Heat-Stable Binder and Comprising an Evaporation Retardant Compound A pigmented initial composition CP1 without a fluorinated heat-stable binder is prepared under stirring, the various constituents of which and their respective amounts expressed in wt % relative to the total weight of the composition are given below:

Pigmented Initial Composition CP1:

| | |
|---|---|
| Ethylene glycol | 24.3% |
| Polyethylene glycol isotridecyl | 6.1% |
| Hyperdispersant polymer mixture | 0.9% |
| Distilled water | 47.2% |
| Glycerol | 12.2% |
| Anti-foam agent | 0.3% |
| Blue 10C595 pigment | 9% |
| Total | 100% |

In the aqueous composition CP1, the dissolved blue 10C595 pigment has the following grain-size distribution:
D50=930 nm, and
D99=3360 nm.

The term "D50", which represents the median of the particle-size distribution, is as defined previously, and the term "D99" is likewise as defined previously and in the context of the invention represents the maximum dimension of 99% of the particles.

The grain-size distribution of the pigment in the aqueous composition CP1 is therefore not suitable in the present state for application by inkjet. To this end, the pigmented composition CP1 is ground in a horizontal pin mill filled with $ZrO_2$ beads.

After two hours of milling, a secondary pigmented composition CP1' without a heat-stable binder is obtained, for which the following grain-size distribution is attained for the blue pigment:
D50=170 nm, and
D99=415 nm.

This secondary composition CP1' has a dry matter percentage of 9%.

After this milling step, a PTFE dispersion is added to the nanometric CP1' pigment dispersion in the proportions (in parts by weight) indicated below in order to form the aqueous ink composition EA1:

| Aqueous ink composition EA1 | Proportions (parts by weight) |
|---|---|
| CP1' pigment dispersion (9% dry matter) | 100 |
| PTFE dispersion (60% dry matter) | 7.5 |

The addition of PTFE does not cause the pigments to agglomerate. The rheological profile of the aqueous ink composition EA1 is Newtonian. The viscosity measured at 25° C. is 20 mPa·s.

The jettability of the ink EA1 was validated at 25° C. with the ARDEJE HA5 printing device at a frequency of 1.7 kHz. The following characteristics are obtained:
the drops velocity is 4.5 m/s,
the open time of the nozzle is longer than 1 minute,
it is noted that the drops trains are well-separated and that the flank advances in a uniform manner;
it is also noted that the tip of the nozzle is still clean after the printing is finished, clearly indicating that the nozzle is able to function for a long time without fouling.

Owing to the glycerol, the imprint of the drop on the substrate is uniform and without a halo.

The printing result does not show any noticeable, undesired, or uncontrolled change in color or properties after exposure to at least a temperature of 110° C., and above all to temperatures of at least 250° C.

Example 2: Non-Pigmented Aqueous Ink EA2 of the Invention, Containing a Fluorinated Heat-Stable Binder and Comprising at Least One Evaporation Retardant Compound A non-pigmented aqueous ink composition EA2 comprising a fluorinated heat-stable binder is prepared, the various constituents of which and their respective amounts expressed in wt % relative to the total weight of the composition are given below:

Non-Pigmented Aqueous Composition EA2:

| | |
|---|---|
| Polyethylene glycol isotridecyl | 4.1% |
| PTFE dispersion | 17.2% |
| Distilled water | 73.7% |
| Glycerol | 5% |
| Total | 100% |

The aqueous composition EA2 is prepared as follows:
under moderate stirring, water is added to the PTFE dispersion to form a diluted PTFE dispersion;
next the surfactant and then the glycerol are added to the diluted PTFE dispersion;
a stable dispersion is obtained, which is filtered, for example, by dead-end filtration through cellulose acetate syringe filters with a porosity of 0.8 μm and then of 0.45 μm. The addition of glycerol and surfactant does not modify the size of the different species in dispersion.

The viscosity of the aqueous ink EA2 measured at 25° C. is 2.8 mPa·s, the surface tension of the fluid measured by a WILHELMY plate tensiometer is 28.3 mN/m, and the profile is Newtonian.

The jettability of the ink EA2 was validated with the ARDEJE HA5 printing device at a frequency of 1.7 kHz operating at a temperature of 25° C. The following characteristics are obtained:
the drops velocity is 4 m/s,
the open time of the nozzle is 1 minute,
it is noted that the drops trains are well-separated and that the flank advances in a uniform manner;
it is also noted that the tip of the nozzle is still clean after the printing is finished, clearly indicating that the nozzle is able to function for a long time without fouling.

Owing to the glycerol, the imprint of the drop on the substrate is uniform and without a halo.

The printing result does not show any noticeable, undesired, or uncontrolled change in color or properties after exposure to at least a temperature of 110° C., and above all to temperatures of at least 250° C.

Example 3: Non-Pigmented Aqueous Ink EA3 of the Invention, Containing a Fluorinated Heat-Stable Binder and Comprising an Evaporation Retardant Compound A non-pigmented aqueous ink composition EA3 comprising a fluorinated heat-stable binder is prepared, the various constituents of which and their respective amounts expressed in wt % relative to the total weight of the composition are given below:

Non-Pigmented Aqueous Composition EA3:

| Polyethylene glycol isotridecyl | 4.1% |
|---|---|
| PTFE dispersion (58% DM) | 17.2% |
| Distilled water | 48.7% |
| Propylene glycol | 30.0% |
| Total | 100% |

The aqueous composition EA3 is prepared as follows:
under moderate stirring, water is added to the PTFE dispersion to form a diluted PTFE dispersion;
next the surfactant and then the propylene glycol are added to the diluted PTFE dispersion;
a stable dispersion is obtained, which is filtered, for example, by dead-end filtration through cellulose acetate syringe filters with a porosity of 0.8 μm and then of 0.45 μm. The addition of propylene glycol and surfactant does not modify the size of the different species in dispersion.

The viscosity of the aqueous ink EA3 measured at 35° C. is 3.6 mPa·s, and the surface tension of the fluid measured by a WILHELMY plate tensiometer is 30.3 mN/m.

The jettability of the ink EA3 was validated with the ARDEJE HA5 printing device at a frequency of 1.7 kHz operating at a temperature of 35° C. The following characteristics are obtained:
the drops velocity is 4.5 m/s,
the open time of the nozzle is 2 minutes,
it is noted that the drops trains are well-separated and that the flank advances in a uniform manner;
it is also noted that the tip of the nozzle is still clean after the printing is finished, clearly indicating that the nozzle is able to function for a long time without fouling.

The printing result does not show any noticeable, undesired, or uncontrolled change in color or properties after exposure to at least a temperature of 110° C., and above all to temperatures of at least 250° C.

Example 4: Non-Pigmented Aqueous Ink EA4 of the Invention, Containing a Fluorinated Heat-Stable Binder A non-pigmented aqueous ink composition EA4 comprising a fluorinated heat-stable binder is prepared, the various constituents of which and their respective amounts expressed in wt % relative to the total weight of the composition are given below:

Non-Pigmented Aqueous Composition EA4:

| Polyethylene glycol isotridecyl | 5% |
|---|---|
| FEP dispersion (55% DM) | 10.0% |
| Distilled water | 80% |
| Glycerol | 5.0% |
| Total | 100% |

The aqueous composition EA4 is prepared as follows:
under moderate stirring, water is added to the FEP dispersion to form a diluted FEP dispersion;
next the surfactant and then the glycerol are added to the diluted FEP dispersion;
a stable dispersion is obtained, which is filtered, for example, by dead-end filtration through cellulose acetate syringe filters with a porosity of 0.8 μm and then of 0.45 μm. The addition of glycerol and surfactant does not modify the size of the different species in dispersion.

The viscosity of the aqueous ink EA4 measured at 25° C. is 20 mPa·s.

The jettability of the ink EA4 was validated with the ARDEJE HA5 printing device at a frequency of 1.7 kHz operating at a temperature of 25° C. The following characteristics are obtained:
the drops velocity is 4.5 m/s,
the open time of the nozzle is 2 minutes,
it is noted that the drops trains are well-separated and that the flank advances in a uniform manner;
it is also noted that the tip of the nozzle is still clean after the printing is finished, clearly indicating that the nozzle is able to function for a long time without fouling.

The printing result does not show any noticeable, undesired, or uncontrolled change in color or properties after exposure to at least a temperature of 110° C., and above all to temperatures of at least 250° C.

Example 5: Pigmented Aqueous Ink EA5 of the Invention, Containing a Fluorinated Heat-Stable Binder and a Non-fluorinated Heat-Stable Binder, as Well as an Evaporation Retardant Compound A pigmented initial composition CP5 without a fluorinated heat-stable binder and without a non-fluorinated heat-stable binder is prepared, the various constituents of which and their respective amounts expressed in wt % relative to the total weight of the composition are given below:

Pigmented Initial Composition CP5:

| Ethylene glycol | 24.3% |
|---|---|
| Polyethylene glycol isotridecyl | 7% |
| Distilled water | 11.2% |
| Glycerol | 12.2% |
| Anti-foam agent | 0.3% |
| 20% Cabot carbon black | 45.0% |
| Total | 100% |

In the aqueous composition CP5, the dissolved black pigments have the following grain-size distribution:
D50=140 nm, and
D99=335 nm.

The pigments are compatible in the present state with inkjet printing.

To this pigment dispersion (CP5) are added a PTFE dispersion and PAI in aqueous phase in the proportions (in parts by weight) indicated below in order to form the aqueous ink composition EA5:

| Aqueous ink composition EA5 | Proportions (parts by weight) |
|---|---|
| CP5 pigment dispersion (9% dry matter) | 100 |
| PTFE dispersion (58% dry matter) | 7.5 |
| Polyamide-imide in aqueous phase (10% dry matter) | 4.5 |

The addition of PTFE and PAI does not cause the pigments to agglomerate. The rheological profile of the aqueous ink composition EA5 is Newtonian and the viscosity at 25° C. is 21 mPa·s.

The jettability of the ink EA5 was validated at 25° C. with the ARDEJE HA5 printing device at a frequency of 1.7 kHz. The following characteristics are obtained:
the drops velocity is 4.5 m/s,
the open time of the nozzle is 2 minutes,
it is noted that the drops trains are well-separated and that the flank advances in a uniform manner;
it is also noted that the tip of the nozzle is still clean after the printing is finished, clearly indicating that the nozzle is able to function for a long time without fouling.

Owing to the glycerol, the imprint of the drop on the substrate is uniform and without a halo.

The printing result does not show any noticeable, undesired, or uncontrolled change in color or properties after exposure to at least a temperature of 110° C., and above all at temperatures of to least 250° C.

Comparative Example 1: Pigmented Aqueous Ink EC1 without a Fluorinated Heat-Stable Binder and Containing a Solvent Having a Vapor Pressure Greater than that of Water A pigmented initial composition EC1 without a fluorinated heat-stable binder is prepared, in which the solvent used is ethanol, which is a solvent with a vapor pressure greater than that of water for a temperature of 5° C. to 50° C. and at atmospheric pressure.

The various constituents of the composition and their respective amounts expressed in wt % relative to the total weight of the composition are given below:
Pigmented Initial Composition EC1:

| Distilled water | 50.0% |
|---|---|
| Ethanol | 25.0% |
| 20% Cabot carbon black | 25.0% |
| Total | 100% |

In the aqueous composition EC1, the dissolved black pigments have the following grain-size distribution:
D50=140 nm, and
D99=335 nm.

The pigments are compatible in the present state with inkjet printing.

The rheological profile of the aqueous ink composition EC1 is Newtonian and the viscosity is 4.4 mPa·s.

The jettability of the ink EC1 was validated at 25° C. with the ARDEJE HA5 printing device at a frequency of 1.7 kHz. The following characteristics are obtained:
the drops velocity is 4.5 m/s,
the open time of the nozzle is 5 seconds,
it is noted that the tip of the nozzle dries immediately, clearly indicating that the nozzle cannot function for a long time without fouling.

Comparative Example 2: Particulate Ink Having a Non-Heat Stable Acrylic Binder

A non-pigmented aqueous ink composition comprising a non-heat stable acrylic binder (benzyl acrylate/methacrylic acid copolymer) is prepared, the various constituents of which and their respective amounts are given below in wt % relative to the total weight of the composition:
Non-Pigmented Aqueous Composition:

| Polyethylene glycol isotridecyl | 5% |
|---|---|
| Benzyl acrylate/methacrylic acid copolymer dispersion (55% DM) | 10.0% |
| Distilled water | 80% |
| Glycerol | 5.0% |
| Total | 100% |

The aqueous composition is prepared as follows:
the surfactant and then the glycerol are added to a benzyl acrylate/methacrylic acid copolymer dispersion;
a stable dispersion is obtained, which is filtered by, for example, dead-end filtration through cellulose acetate syringe filters with a porosity of 0.8 μm and then of 0.45 μm. The addition of glycerol and surfactant does not modify the size of the different species in dispersion.

The viscosity of the aqueous ink measured at 25° C. is 22 mPa·s.

The jettability of the ink was validated with the ARDEJE HA5 printing device at a frequency of 1.7 kHz operating at a temperature of 25° C. The following characteristics are obtained:
the drops velocity is 4.6 m/s,
the open time of the nozzle is 2 minutes,
it is noted that the drops trains are well-separated and that the flank advances in a uniform manner;
it is also noted that the tip of the nozzle is still clean after the printing is finished, clearly indicating that the nozzle can function for a long time without fouling.

The printing result shows a noticeable change in its properties after having been subjected to a temperature of 250° C. The printed layer indeed shows significant yellowing after exposure to that temperature due to the degradation of the acrylic copolymer.

Comparative Example 3: Particulate Ink with a Non-Heat Stable Polyurethane Binder A non-pigmented aqueous ink composition comprising a non-heat stable polyurethane resin binder is prepared, the various constituents of which and their respective amounts are given below in wt % relative to the total weight of the composition:
Non-Pigmented Aqueous Composition EA4:

| Polyethylene glycol isotridecyl | 5% |
|---|---|
| Polyurethane resin aqueous dispersion | 10.0% |

-continued

| Distilled water | 80% |
|---|---|
| Glycerol | 5.0% |
| Total | 100% |

The aqueous composition is prepared as follows:
the surfactant and then the glycerol are added to a polyurethane resin dispersion;
a stable dispersion is obtained, which is filtered by, for example, dead-end filtration through cellulose acetate syringe filters with a porosity of 0.8 μm and then of 0.45 μm. The addition of glycerol and surfactant does not modify the size of the different species in dispersion.

The viscosity of the aqueous ink measured at 25° C. is 23 mPa·s.

The jettability of the ink was validated with the ARDEJE HA5 printing device at a frequency of 1.7 kHz operating at a temperature of 25° C. The following characteristics are obtained:
the drops velocity is 4.6 m/s,
the open time of the nozzle is 2 minutes,
it is noted that the drops trains are well-separated and that the flank advances in a uniform manner;
it is also noted that the tip of the nozzle is still clean after the printing is finished, clearly indicating that the nozzle can function for a long time without fouling.

The printing result shows a noticeable change in its properties after having been subjected to a temperature of 250° C. The printed layer indeed shows significant yellowing after exposure to that temperature due to the degradation of the polyurethane resin.

Comparative Example 4: Pigmented Aqueous Ink Containing a Non-Heat Stable Acrylic Binder and Comprising an Evaporation Retardant Compound An initial pigmented composition containing an acrylic binder is prepared under stirring, the various constituents of which and their respective amounts are given below in wt % relative to the total weight of the composition:
Initial Pigmented Composition:

| Ethylene glycol | 24.3% |
|---|---|
| Polyethylene glycol isotridecyl | 6.1% |
| Hyperdispersant polymer mixture | 0.9% |
| Distilled water | 47.2% |
| Glycerol | 12.2% |
| Anti-foam agent | 0.3% |
| Blue 10C595 pigment | 9% |
| Total | 100% |

In the aqueous composition, the dissolved blue 10C595 pigment has the following grain-size distribution:
D50=930 nm, and
D99=3360 nm.

The term "D50", which represents the median of the particle-size distribution, is as defined previously, and the term "D99" is likewise as defined previously and, in the context of the present invention, represents the maximum dimension of 99% of the particles.

The grain-size distribution of the pigment in the aqueous composition is therefore not suitable, in the present state, for application by inkjet. To this end, the pigmented composition is ground in a horizontal pin mill filled with $ZrO_2$ beads.

After two hours of milling, a secondary pigmented composition without any heat-stable binder is obtained, for which the following grain-size distribution is attained for the blue pigment:
D50=170 nm, and
D99=415 nm.

This secondary composition has a dry matter percentage of 9%.

After this milling step, an acrylic copolymer dispersion is added to the nanometric pigment dispersion in the proportions (in parts by weight) indicated below in order to form the aqueous ink composition:

| Aqueous ink composition | Proportions (parts by weight) |
|---|---|
| Pigment dispersion (9% dry matter) | 100 |
| Benzyl acrylate/methacrylic acid copolymer dispersion (60% dry matter) | 7.5 |

The rheological profile of the aqueous ink composition is Newtonian. The viscosity measured at 25° C. is 20 mPa·s.

The jettability of the ink was validated at 25° C. with the ARDEJE HA5 printing device at a frequency of 1.7 kHz. The following characteristics are obtained:
the drops velocity is 4.5 m/s,
the open time of the nozzle is longer than 1 minute,
it is noted that the drops trains are well-separated and that the flank advances in a uniform manner;
it is also noted that the tip of the nozzle is still clean after the printing is finished, clearly indicating that the nozzle is able to function for a long time without fouling.

The printing result shows a noticeable change in its properties after having been subjected to a temperature of 250° C. The printed layer indeed shows significant yellowing after exposure to that temperature due to the degradation of the acrylic copolymer.

Comparative Example 5: Pigmented Aqueous Ink Containing a Non-Heat Stable Acrylic Binder, a Dispersion of Heat-Stable Fluorinated Particles and an Evaporation Retardant Compound The use of PTFE particles bound by an acrylic polymer substrate for conveying lubricating and abrasion resistance properties to the compositions containing the same after they have been printed is known to the prior art.

An initial pigmented composition containing an acrylic binder is prepared under stirring, the various constituents of which and their respective amounts are given below in wt % relative to the total weight of the composition:
Initial Pigmented Composition:

| Ethylene glycol | 24.3% |
|---|---|
| Polyethylene glycol isotridecyl | 6.1% |
| Hyperdispersant polymer mixture | 0.9% |
| Distilled water | 47.2% |
| Glycerol | 12.2% |

-continued

| | |
|---|---|
| Anti-foam agent | 0.3% |
| Blue 10C595 pigment | 9% |
| Total | 100% |

In the aqueous composition, the dissolved blue 10C595 pigment has the following grain-size distribution:
D50=930 nm, and
D99=3360 nm.

The term "D50", which represents the median of the particle-size distribution, is as defined previously, and the term "D99" is likewise as defined previously and, in the context of the present invention, represents the maximum dimension of 99% of the particles.

The grain-size distribution of the pigment in the aqueous composition is therefore not suitable, in the present state, for application by inkjet. To this end, the pigmented composition is ground in a horizontal pin mill filled with $ZrO_2$ beads.

After two hours of milling, a secondary pigmented composition without a heat-stable binder is obtained, for which the following grain-size distribution is attained for the blue pigment:
D50=170 nm, and
D99=415 nm.

This secondary composition has a dry matter percentage of 9%.

After this milling step, a PTFE particles dispersion and an acrylic copolymer dispersion are added to the nanometric pigment dispersion in the proportions (in parts by weight) indicated below in order to form the aqueous ink composition:

| Aqueous ink composition | Proportions (parts by weight) |
|---|---|
| Pigment dispersion (9% dry matter) | 100 |
| Benzyl acrylate/methacrylic acid copolymer dispersion (60% dry matter) | 5 |
| PTFE particles dispersion (58% dry matter) | 5 |

The rheological profile of the aqueous ink composition is Newtonian. The viscosity measured at 25° C. is 20 mPa·s.

The jettability of the ink was validated at 25° C. with the ARDEJE HA5 printing device at a frequency of 1.7 kHz. The following characteristics are obtained:
the drops velocity is 4.5 m/s,
the open time of the nozzle is longer than 1 minute,
it is noted that the drops trains are well-separated and that the flank advances in a uniform manner;
it is also noted that the tip of the nozzle is still clean after the printing is finished, clearly indicating that the nozzle is able to function for a long time without fouling.

The printing result shows a noticeable change in its properties after having been subjected to high temperatures.

At 250° C., the printed layer shows significant yellowing due to the degradation of the acrylic copolymer. In this case, the quality of the film is poor with a total lack of cohesion of the pigments and PTFE particles on the substrate.

At 350° C., which is greater than the fusion temperature of the PTFE particles, the film is of poor quality because the degradation of the acrylic polymer prevents the fluorinated species from forming a film.

In all cases, the printing rendering is tarnished by the temperature-induced browning of the acrylic.

The invention claimed is:

1. A particulate composition for inkjet use, comprising:
10 wt % to 95 wt % of water relative to the total weight of the composition, and
90 wt % to 5 wt % relative to the total weight of the composition of at least one fluorinated heat-stable binder,
wherein the composition comprises a dry extract within a range of from 6 weight % to 13 weight %, based on the total weight of the composition,
wherein the composition further comprises at least 1 wt % relative to the total weight of said composition of at least one evaporation retardant compound, which has a vapor pressure lower than that of water for a temperature of 5° C. to 50° C. and at atmospheric pressure, said compound being at least partially water miscible, and
wherein a total amount of binders used to form the composition consists of the at least one fluorinated heat-stable binder and, optionally, at least one non-fluorinated heat-stable binder, and wherein the fluorinated and non-fluorinated heat-stable binders are temperature-stable at temperatures of at least 250° C. in a film formed from the composition, and
wherein at least one of the characteristic dimensions of the particles of the fluorinated heat-stable binder contained in the composition is smaller than 400 nm.

2. Composition as in claim 1, wherein the evaporation retardant compound is chosen from the group comprising surfactants, moisturizers, anti-foam agents, and water-soluble or partially water-soluble solvents.

3. Composition as in claim 1, which is pigment-free and comprises at least a solvent and/or a moisturizer.

4. Composition as in claim 1, wherein the fluorinated heat-stable binders are fluorocarbonated resins chosen from the group comprising polytetrafluoroethylene (PTFE), tetrafluoroethylene/perfluoropropyl vinyl ether copolymer (PFA) and tetrafluoroethylene/hexafluoropropene copolymer (FEP), polyvinylidene fluoride (PVDF), MVA (TFE/PMVE copolymer), TFE/PMVE/FAVE terpolymer, ETFE, polychlorotrifluoroethylene (PCTFE), the associated copolymers thereof, and mixtures thereof.

5. Composition as in claim 1, comprising the at least one non-fluorinated heat-stable binder.

6. Composition as in claim 5, wherein the non-fluorinated heat-stable binder is chosen from the group comprising polyphenylene sulfide (PPS), polyethersulfone (PES), polyether ether ketones (PEEK), polyether ketones (PEK), polyimide-imides (PAI), and polyimides.

7. Composition as in claim 1, further comprising at least one heat-stable pigment in an amount such that said fluorinated heat-stable binder and said heat-stable pigment make up 90 to 5 wt % of the total weight of the composition, wherein said heat-stable pigment is also in particle form, at least one of the characteristic dimensions thereof being smaller than 800 nm.

8. Composition as in claim 7, wherein the heat-stable pigment is chosen from the group comprising carbon blacks, mineral pigments and organic pigments, thermochromic semiconductor pigments, and mixtures thereof.

9. Composition as in claim 7, wherein at least one of the characteristic dimensions of the particles of the heat-stable pigment contained in the composition is smaller than 400 nm.

10. Composition as in claim 1, comprising at least two evaporation retardant compounds.

11. Composition as in claim 10, wherein the evaporation retardant compounds comprise at least:
two different surfactants;
a surfactant and a solvent; or
a surfactant and a moisturizer; or
a moisturizer and a solvent; or
two solvents.

12. Composition as in claim 11, wherein the sum of the weight percentages of the two evaporation retardant compounds is greater than 5 wt % relative to the total weight of the composition.

13. Composition as in claim 12, wherein the weight ratio of the amount of the first evaporation retardant compound to that of the second evaporation retardant compound ranges from 0.001 to 1000.

14. A particulate composition for inkjet use, comprising:
10 wt % to 95 wt % of water relative to the total weight of the composition, and
90 wt % to 5 wt % relative to the total weight of the composition of at least one fluorinated heat-stable binder,
wherein the composition comprises a dry extract within a range of from 6 weight % to 13 weight %, based on the total weight of the composition,
wherein the composition further comprises at least 1 wt % relative to the total weight of said composition of at least one evaporation retardant compound, which has a vapor pressure lower than that of water for a temperature of 5° C. to 50° C. and at atmospheric pressure, said compound being at least partially water miscible, and
wherein a total amount of binders used to form the composition consists of the at least one fluorinated heat-stable binder and, optionally, at least one non-fluorinated heat-stable binder, and wherein the fluorinated and non-fluorinated heat-stable binders are temperature-stable at temperatures of at least 250° C. in a film formed from the composition, and
wherein at least one of the characteristic dimensions of the particles of the fluorinated heat-stable binder and of a heat-stable pigment contained in the composition is smaller than 400 nm.

* * * * *

UNITED STATES PATENT AND TRADEMARK OFFICE
CERTIFICATE OF CORRECTION

PATENT NO. : 9,920,208 B2
APPLICATION NO. : 14/408445
DATED : March 20, 2018
INVENTOR(S) : Laurent Caillier et al.

Page 1 of 1

It is certified that error appears in the above-identified patent and that said Letters Patent is hereby corrected as shown below:

Column 18, Line 50, Claim 6, delete "polyimide-imides" and insert -- polyamide-imides --

Signed and Sealed this
Third Day of July, 2018

Andrei Iancu
*Director of the United States Patent and Trademark Office*